(12) United States Patent
Vanga

(10) Patent No.: US 11,230,331 B2
(45) Date of Patent: Jan. 25, 2022

(54) DRAG REDUCTION MECHANISM USING MAGNETISM

(71) Applicant: Venkata Leela Maruthi Ganesh Vanga, Nashville, TN (US)

(72) Inventor: Venkata Leela Maruthi Ganesh Vanga, Nashville, TN (US)

(*) Notice: Subject to any disclaimer, the term of this patent is extended or adjusted under 35 U.S.C. 154(b) by 40 days.

(21) Appl. No.: 16/900,497

(22) Filed: Jun. 12, 2020

(65) Prior Publication Data

US 2021/0284254 A1 Sep. 16, 2021

Related U.S. Application Data

(60) Provisional application No. 62/866,364, filed on Jun. 25, 2019.

(51) Int. Cl.
*B62D 35/00* (2006.01)

(52) U.S. Cl.
CPC .................. *B62D 35/007* (2013.01)

(58) Field of Classification Search
CPC .................................................... B62D 35/007
See application file for complete search history.

(56) References Cited

U.S. PATENT DOCUMENTS

| 4,311,334 | A | * | 1/1982 | Jenkins | B62D 35/001 105/20 |
| 5,018,779 | A | * | 5/1991 | Lund | B62D 35/001 296/180.1 |
| 5,454,619 | A | * | 10/1995 | Haraway, Jr. | B62D 35/007 296/180.1 |
| 2013/0228236 | A1 | * | 9/2013 | Evans | B64C 23/06 137/351 |

FOREIGN PATENT DOCUMENTS

GB 2508357 A * 6/2014 ........... B62D 35/001

* cited by examiner

*Primary Examiner* — Lori L Lyjak
(74) *Attorney, Agent, or Firm* — Lorena Gomez; NCCU IP Clinic

(57) ABSTRACT

A drag reduction apparatus assists with fuel efficiency of mechanical moving objects includes a processor, mechanical mechanism, casing and magnetic pairs that utilizes magnetic repulsion phenomenon for drag reduction. The device further contains a first set of magnets attached to the outer surface and processor attached inside the body; mechanical mechanism attached to the body with pivot joints; casing with second set of magnets on inner surface lowered onto the body attached with first set of magnets and mechanical mechanism. The first set of magnets attached to the body and mechanical mechanism and the second set of magnets attached to the casing form magnetic repulsion pairs creating magnetic levitation of casing while transferring and resisting drag force.

9 Claims, 12 Drawing Sheets

DRAG REDUCTION MECHANISM USING MAGNETISM

REFERENCE TO RELATED APPLICATIONS

This application claims the benefit of U.S. Provisional Application No. 62/866,364, filed on Jun. 25, 2019, which is hereby incorporated in its entirety.

FIELD OF THE INVENTION

The present invention relates to a drag reduction apparatus. More specifically, the invention pertains to a drag reduction apparatus configured by the aerodynamics of moving mechanical objects that reduces drag and increases fuel efficiency of mechanical objects in motion.

BACKGROUND OF THE INVENTION

The following description is not an admission that any of the information provided herein is prior art or relevant to the present invention, or that any publication specifically or implicitly referenced is prior art. Any publications cited in this description are incorporated by reference herein. Where a definition or use of a term in an incorporated reference is inconsistent or contrary to the definition of that term provided herein, the definition of that term provided herein applies and the definition of that term in the reference does not apply.

Improving fuel efficiency in all moving mechanical objects across a variety of fields and various mechanical object types, whether the mechanical object be aerospace, rocket, marine or automobile-based, has been the focus of scientific research related to drag reduction. Even with the ability to focus on various mechanical object types, automobiles have been a prominent area of scientific research related to drag reduction in order to reduce the fuel (fossil or electric power) costs and/or emissions, among other concerns. Accordingly, this application will focus on the automobile, but the concepts and application of the invention is not limited to the automobile. Drag reduction can be considered one of several ways to improve fuel efficiency. Alternate ways include improving efficiency of internal components that transfer power from combustion to the linear motion, energy harvesting from combustion through improved fuel compositions, fuel additives and improvements in electrical power production.

Drag is the resistance force experienced by a moving object in ambient fluid. For the purposes of this application, references to "ambient fluid" refer to air or water (rain or mist). As a moving object pushes ambient fluid out of its way, ambient fluid pushes back on the object. This drag force is always in opposite direction to the object's motion. Drag is considered one of the major inevitable losses experienced by a moving object in the ambient fluid.

For the foregoing reasons, with the depletion of fossil fuels, climate change and the cost of electricity generators, there is a need to design more fuel-efficient systems that utilize a drag reduction apparatus.

SUMMARY OF THE INVENTION

The present invention is a drag reduction apparatus that is configured onto the moving mechanical object to assist with fuel efficiency, reducing the operating costs and in reducing the emissions. The apparatus comprises a mechanical mechanism, a processor, a casing and magnets. A first set of magnets are attached to the object external surface. The object with first set of magnets is further attached with mechanical mechanism using pivot joints. A second set of magnets are attached to casing inner surface, at locations symmetric to the first set of magnets attached on object external surface with mechanical mechanism; also, the two sets of magnets are arranged such that the magnetic like poles are facing each other causing magnetic repulsion. Casing with second set of magnets is lowered onto the object attached with first set of magnets and mechanical mechanism; such that casing acts as covering to the object without having direct contact (due to the magnetic repulsion pairs) with the object or with minimal insignificant force carrying contacts. The casing is held in place using magnetic repulsion force, this allows the casing to magnetically levitate and facilitates backward and forward movement to transfer and resist drag force. The arrangement of casing to act as covering to the object provides shielding the moving object from getting in contact with ambient fluid. As the casing covers the moving object the ambient fluid comes in contact with casing external surface and creates a drag force on casing (when object is in motion). Casing moves backward and transfers the drag force to the mechanical mechanism using two magnetic repulsion pairs.

Mechanical mechanism comprises of a pair of magnets attached to frame sitting on rollers, frame connected to a pair of struts, pair struts connected to pair of hydraulic cylinders and pair of hydraulic cylinders connected to spoiler. The drag force transferred to the mechanical mechanism initiates backward movement of frame, struts, this in turn rotates the hydraulic cylinders (in one direction) about a pivot point triggering the processor. The processor collects required data like object speed and ambient fluid speed to evaluate the force required to counter the drag force. After evaluation of the counter force the processor releases the spoiler in a controlled approach such that the force equal to the evaluated counter force is generated at the spoiler. The spoiler force rotates the hydraulic cylinders in opposite direction about the pivot point in turn moving the struts, frame forward and leading to forward movement of the casing, thus resisting the drag force.

Although there is continuous research in the ways to reduce/eliminate drag, the current invention focuses on the basic principle which produces drag, that is drag is generated only when the ambient fluid is in contact with the moving object.

DETAILED DESCRIPTION

A drag reduction apparatus is designed and can be manufactured to reduce drag by creating a barrier, such that the external fluid which creates drag is not in contact with an object while in motion.

Furthermore, as used herein, and unless the context dictates otherwise, the term "user" is intended to include any human operating an object using a vehicle or object employing a drag reduction apparatus. The terms "drag reduction apparatus", and "apparatus" are used interchangeably in the description herein.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

As used herein, the term "about" in conjunction with a numeral refers to a range of that numeral starting from 10% below the absolute of the numeral to 10% above the absolute of the numeral, inclusive.

The detailed description set forth below in connection with the appended drawings is intended to elucidate various embodiments of the subject matter and is not necessarily intended to represent the only embodiment(s). Furthermore, there is no intention to limit the invention or the application and uses of the invention to be bound by any theory presented in the preceding sections or the following detailed description.

In certain instances, the description includes specific details for the purpose of providing understanding of disclosed embodiment(s) and describing the present concept. However, it will be apparent to those skilled in the art that the disclosed embodiment(s) may be practiced without those specific details. In some instances, well-known structures and components may be shown in block diagram form in order to avoid obscuring the concepts of the disclosed subject matter.

As mentioned in preceding sections, the embodiments provided herein are for reducing the drag on moving mechanical objects. Further, the embodiments are shown on a four wheeled vehicle to simplify description of the apparatus. This does not limit the apparatus application to four wheeled vehicles, but can be extended to many mechanical moving objects by making necessary adjustments to the apparatus, ensuring intent of the disclosed invention.

Main objective of the present disclosure is to reduce drag by creating a barrier, such that the ambient fluid which creates drag is not in contact with object (vehicle) in motion. Present disclosure uses the phenomena of magnetic repulsion, that is magnetic like poles when brought near repel each other.

Figure 1:
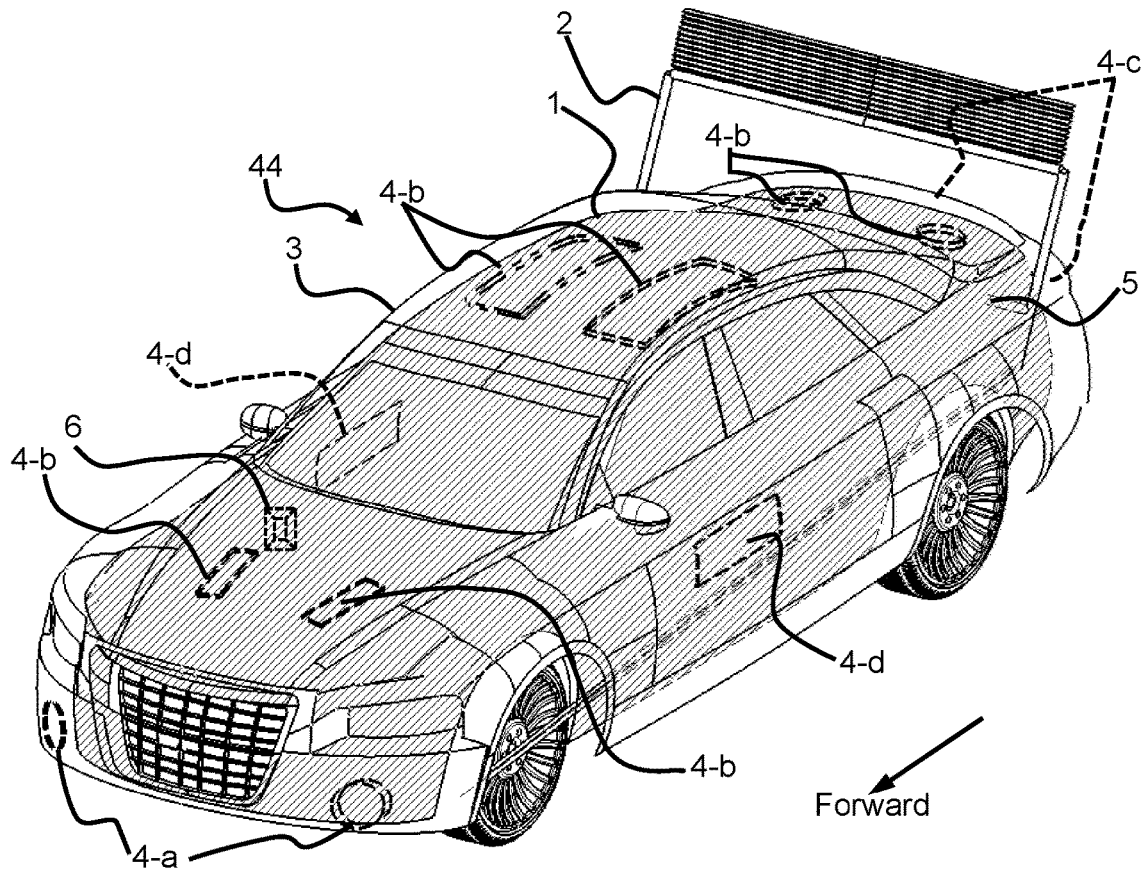
FIG. 1 illustrates a perspective view of an exemplary embodiment of the final modification of vehicle with drag reduction apparatus attached.
Figure 2:
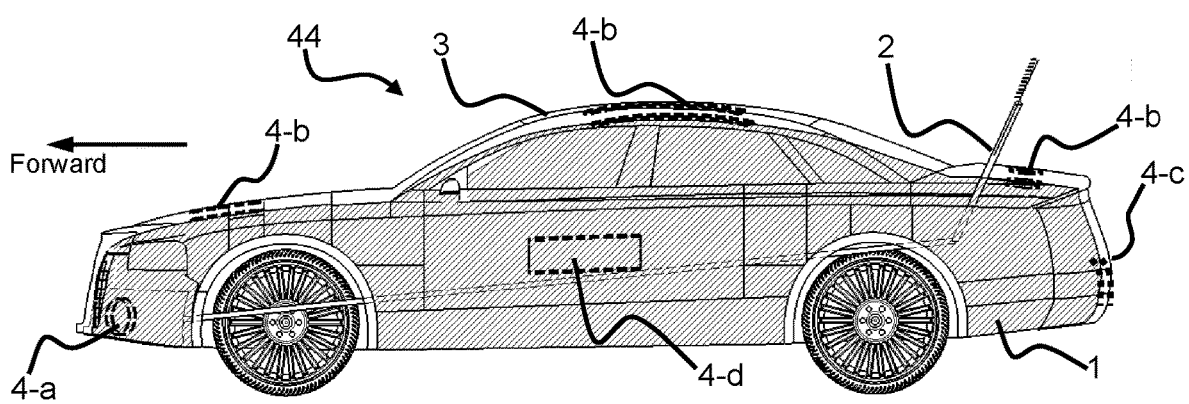
FIG. 2 illustrates a side view of an exemplary embodiment of the final modification of vehicle with drag reduction apparatus attached.

FIGS. 1-2 illustrate an embodiment of final modification-vehicle 44 with a drag reduction apparatus customized onto original vehicle 1, wherein original vehicle 1 does not include any modification, (shown in slant hatching lines) (see also FIG. 9) according to certain aspects of the present disclosure.

A drag reduction apparatus on a final modification-vehicle 44 comprises of mechanical mechanism 2, casing 3, magnets 4a-d and processor 6 as displayed in FIGS. 1-2. The four embodiments (mechanical mechanism 2, casing 3, magnets 4a-d and processor 6) are systematized such that, casing 3 acts as covering to original vehicle 1 (see also FIG. 9), consequently taking the drag force; casing 3 transfers the drag force to the mechanical mechanism 2 using magnets 4-a (4 magnets shown as 2 pairs) (explained in FIG. 10(a)); this triggers the processor 6 (see also FIGS. 13-14 for functionality) which activates mechanical mechanism 2 to resist the drag force (explained in FIG. 10(b)); thus, creating an apparatus that reduces drag on original vehicle 1. In the embodiment magnets 4a-d, total 24 magnets shown as 12 pairs are symmetrically arranged with magnetic like poles facing each other and are further categorized in current embodiments as: 4-a (4 magnets shown as 2 pairs), which take and resist the drag force; 4-b (12 magnets shown as 6 pairs), which help in resisting the weight of the casing 3; 4-c (4 magnets shown as 2 pairs) and 4-d (4 magnets shown as 2 pairs), which help in stabilizing the casing 3 while the final modification-vehicle 44 is starting, moving or stopping. Magnets 4-c (4 magnets) and magnet 4-d (1 right magnet) are on other side of view in FIG. 1, shown using dashed extension line.

Figure 3:
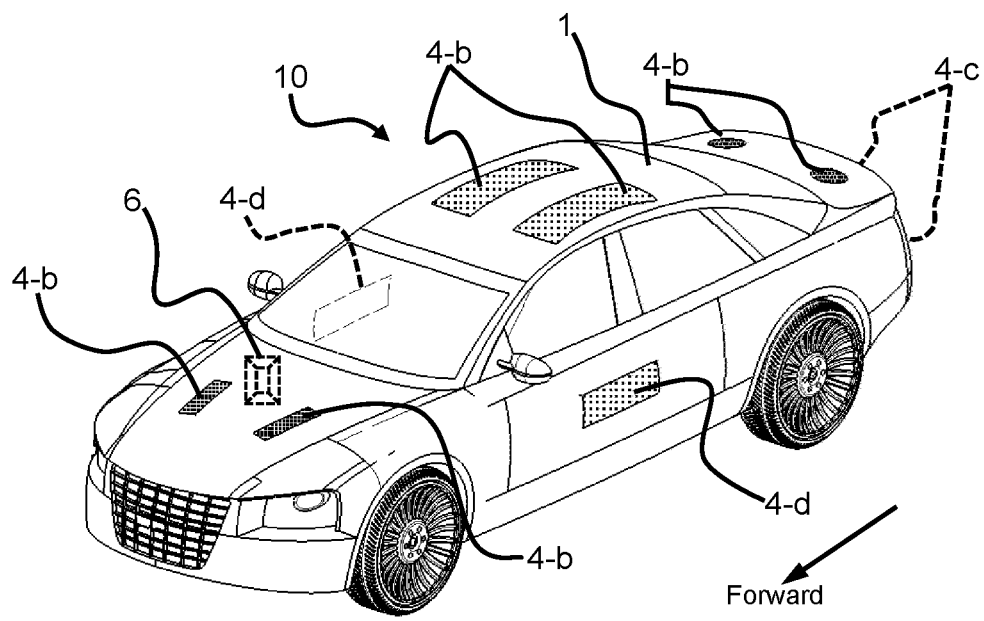
FIG. 3 illustrates an exemplary embodiment of the first modification of vehicle that is retrofitted with magnets and processor in perspective view.

FIG. 3 exemplifies the first modification-vehicle 10, where original vehicle 1 (original vehicle 1 does not include any modification) is retrofitted with a first set of plurality of magnets 4b-d (12 magnets—shown using dotted pattern for visible magnets) on the external surface of original vehicle 1. Magnets 4-b (6 magnets) are attached to the upper surface of original vehicle 1. Magnets 4-c (2 magnets—hidden in FIG. 3) are attached on the back surface of the original vehicle 1. Magnets 4-d (2 magnets) are attached to the left and right surfaces of the original vehicle 1 (left magnet visible and right magnet hidden in FIG. 3). Magnets 4-c (2 magnets) and magnet 4-d (1 right magnet) are on other side of view in FIG. 3, shown using dashed extension line. Processor 6 is customized to original vehicle 1 such that processor 6 gathers vehicle movement data from the original vehicle 1 (see also FIG. 13). The first set of plurality of magnets 4b-d are permanently attached to the external surface of original vehicle 1 using high strength thermally stable epoxy resin.

Figure 4:
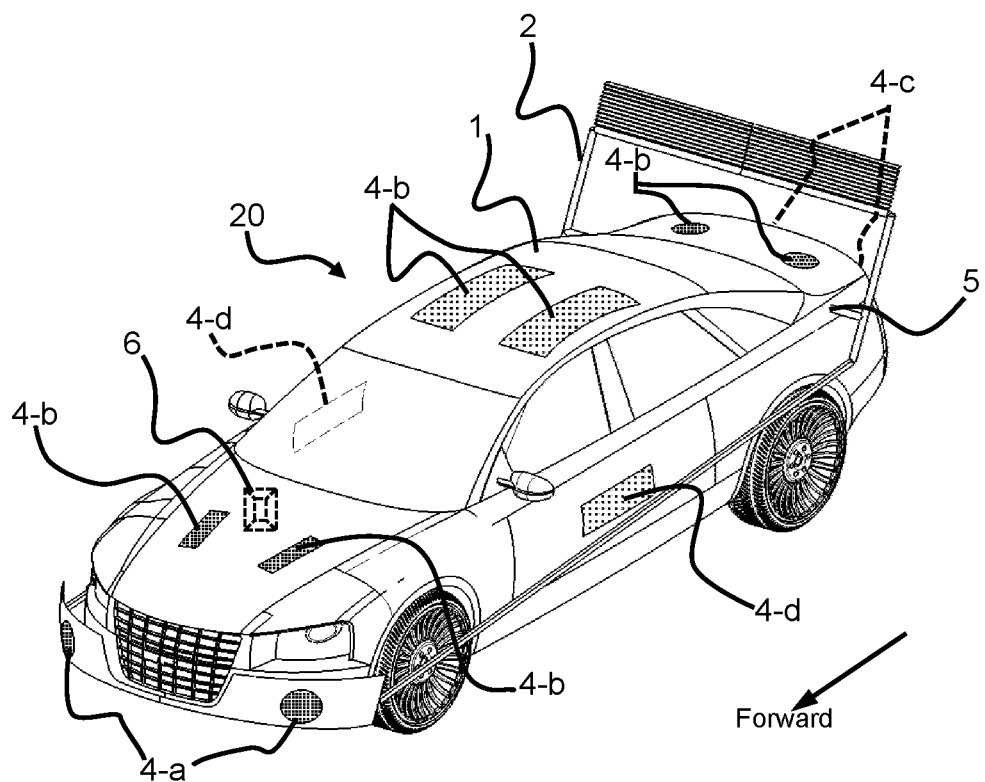
FIG. 4 illustrates a perspective view of an exemplary embodiment of the second modification of vehicle wherein first modification of vehicle (retrofitted with magnets and processor) is attached with mechanical mechanism.
Figure 5:
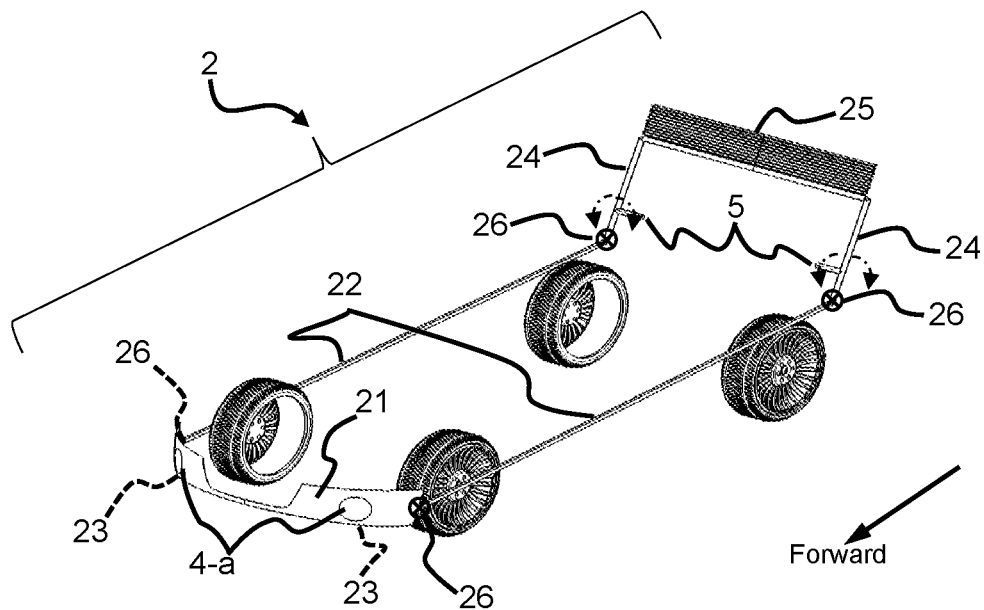
FIG. 5 illustrates an exemplary embodiment of the mechanical mechanism in a perspective view.
Figure 6:
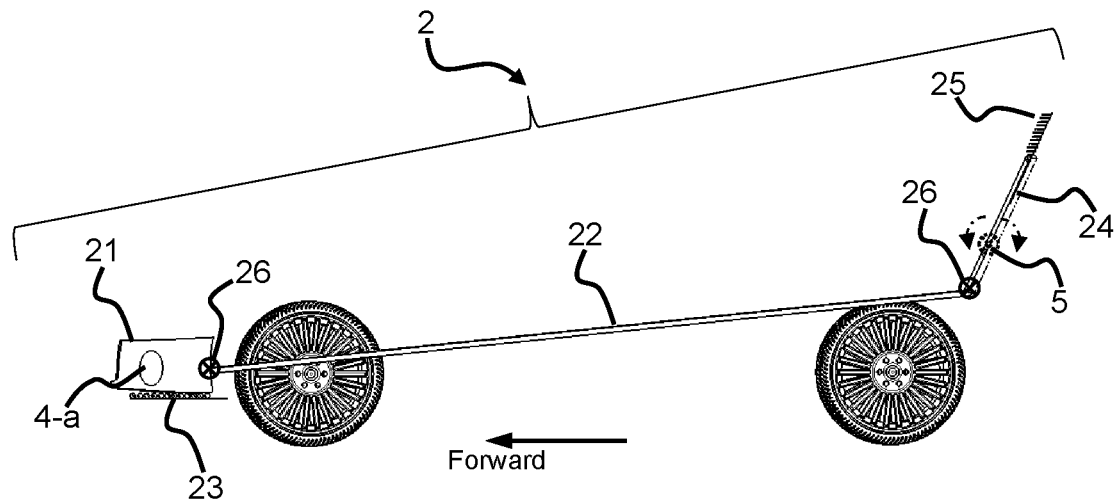
FIG. 6 illustrates a side view of an exemplary embodiment of the mechanical mechanism.

FIG. 4 illustrates an exemplary embodiment of second modification-vehicle 20, where mechanical mechanism 2 is attached to first modification-vehicle 10. FIGS. 5-6 illustrate embodiments of the mechanical mechanism 2 (wheels shown for reference only). Further below, the process of attaching mechanical mechanism 2 is to the first modification-vehicle 10 is described in detail.

The embodiments of mechanical mechanism 2 in FIGS. 5-6 (wheels shown for reference only) include: plurality of magnets 4-a (2 magnets as addition to first set of magnets—shown using dotted pattern) attached to frame 21 at the front-end of mechanical mechanism 2; rollers 23 on which frame 21 sits; struts 22 to transfer and counter drag force; hydraulic cylinders 24 and spoiler 25 at aft end of mechanical mechanism 2. Plurality of magnets 4-a (2 magnets as addition to first set of magnets—shown using dotted pattern) are permanently attached to frame 21 using high strength thermally stable epoxy resin. Rollers 23 (one left and one right—hidden in FIG. 5, left roller visible in FIG. 6) are attached to original vehicle 1 using 'L' shaped clamps. In one embodiment, frame 21 sits on rollers 23 and can move back and front due to the drag force and resisting force along the length of rollers 23. In one embodiment, rollers 23 can be made from high carbon chromium steel, such that rollers 23 are wear resistant. In one embodiment, struts 22 (one left and one right) can be made of carbon fiber reinforced composites which act as force carrying members between the frame 21 and hydraulic cylinders 24. Struts 22 are attached to frame 21 and hydraulic cylinders 24 using cylindrical joints 26 (total 4 locations—3 locations shown, 1 location hidden in FIG. 5). Hydraulic cylinders 24 (one left and one right) are attached to struts 22 at bottom and spoiler 25 at the top.

Mechanical mechanism 2 is attached onto first modification-vehicle 10 (see FIG. 3 & FIG. 4) using pivot joints 5 (2 locations) at hydraulic cylinders 24 locations. Pivot joints 5 are positioned such that hydraulic cylinders 24 forms a mechanical lever while transferring and resisting the drag force by counterclockwise (↺) and clockwise (↻) rotation about pivot joints 5 (counterclockwise and clockwise rotations are defined based on perspective and side views shown in FIGS. 5-6). In another embodiment, once first modification-vehicle 10 is transformed into second modification-vehicle 20 with the attachment of mechanical mechanism 2, the processor 6 (see also FIG. 13) can be electronically connected to mechanical mechanism 2 through wired or wireless connection(s). Processor 6 (see also FIG. 14) has the ability to generate signal that can control hydraulic cylinder 24 and spoiler 25 functionality.

Figure 6A:
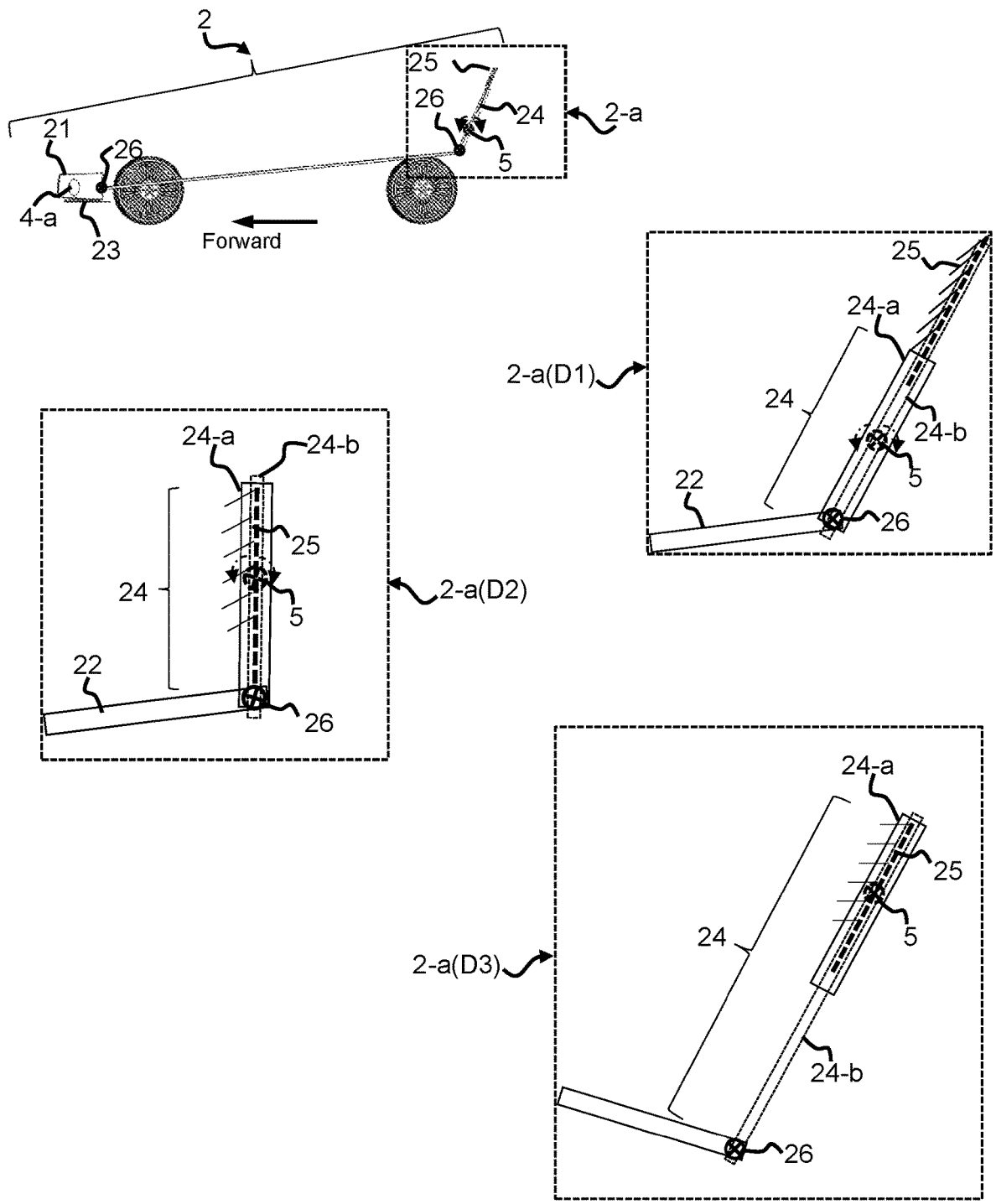
FIG. 6(a) illustrates an exemplary embodiment of the mechanical mechanism with three detailed views of hydraulic cylinder-spoiler sub assembly.
Figure 10A:
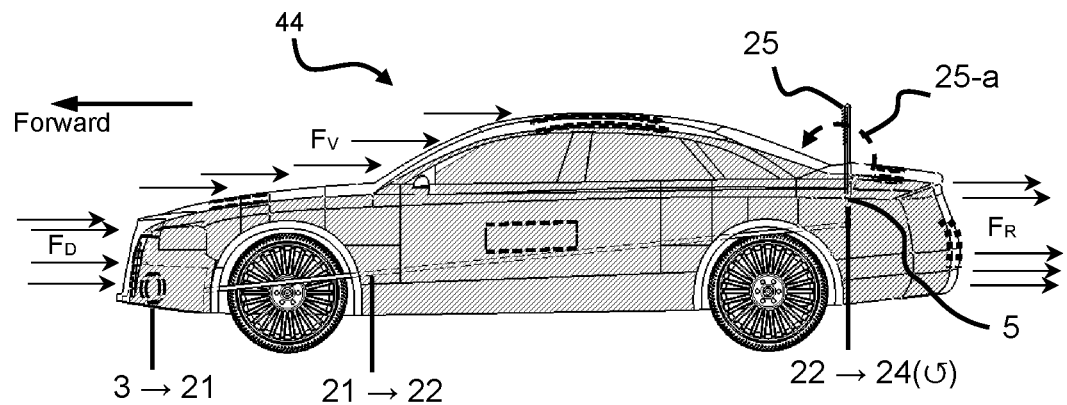
FIG. 10(a) illustrates an exemplary embodiment of movement of casing and mechanical mechanism as reaction to drag force with spoiler in in-active original position.
Figure 10B:
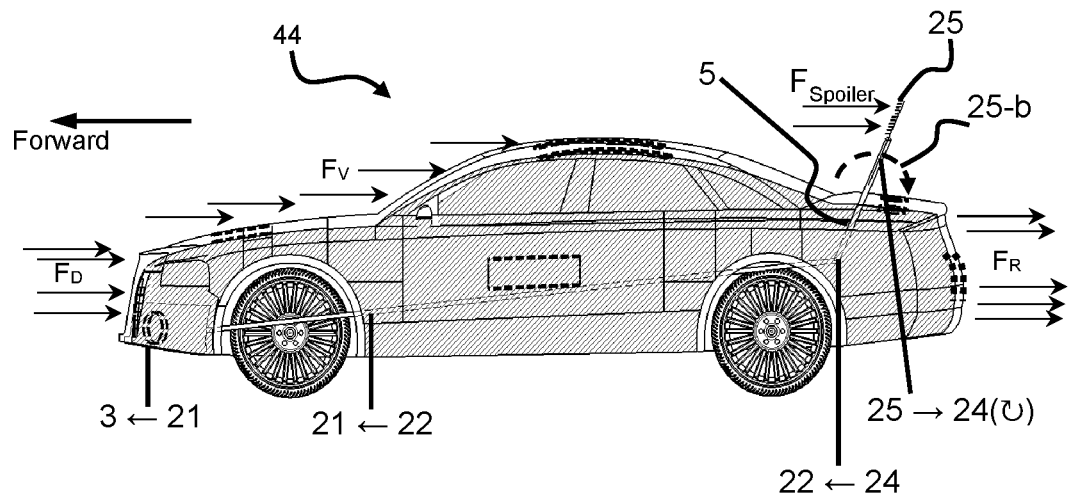
FIG. 10(b) illustrates an exemplary embodiment of movement of casing and mechanical mechanism as reaction to spoiler force with spoiler in active release position.
Figure 11A:
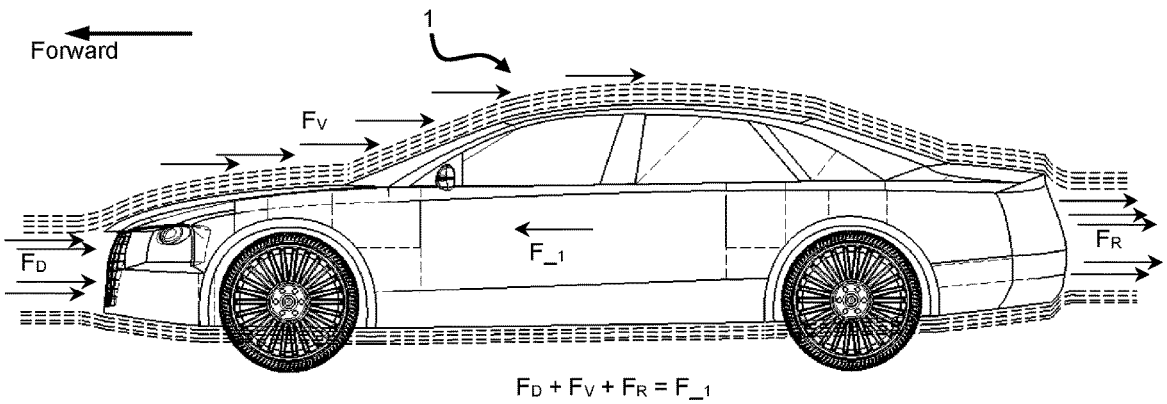
FIG. 11(a) illustrates an exemplary embodiment of the drag force and reaction for original vehicle.
Figure 11B:
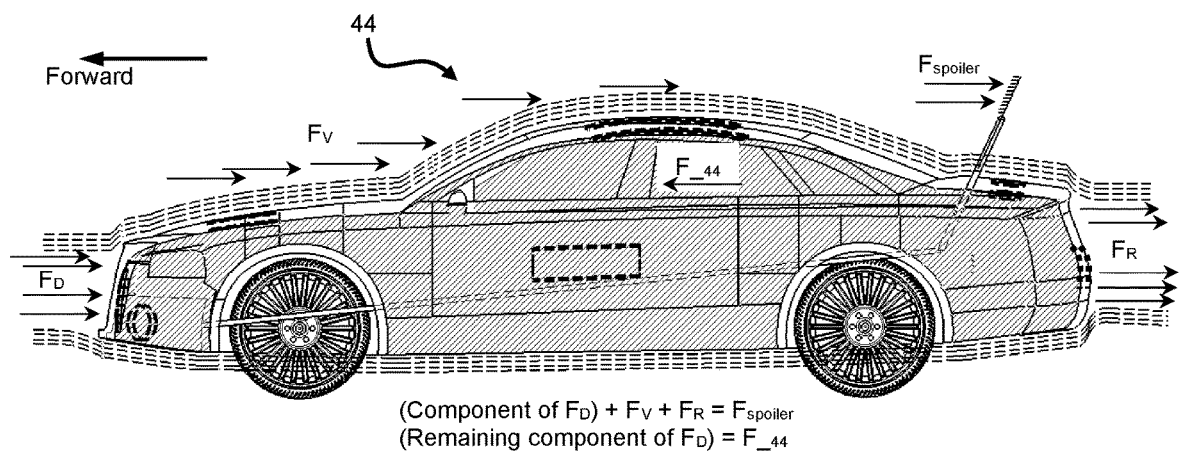
FIG. 11(b) illustrates an exemplary embodiment of the drag force and reaction for final modification of vehicle.

Further, FIG. 6(a) illustrates an embodiment of mechanical mechanism 2 as represented FIG. 6 (a side view) while highlighting the sub-assembly of hydraulic cylinders 24 and spoiler 25 as 2-a (highlighted using box with dotted line border). The embodiment also highlights three detailed views 2-a(D1), 2-a(D2) and 2-a(D3) of hydraulic cylinders 24 and spoiler 25 sub-assembly 2-a. Hydraulic cylinders 24 further constitute an assembly of two cylinders each; external cylinder 24-a and internal cylinder 24-b (shown using dashed outline) as shown in the detailed views 2-a(D1), 2-a(D2) and 2-a(D3). Internal cylinder 24-b is telescopically attached to external cylinder 24-a, such that it can translate up and down upon signal from the processor 6. View 2-a(D1) shows hydraulic cylinders 24 and spoiler 25 sub-assembly in active release position. The active release position view 2-a(D1) shows that internal cylinder 24-b is telescopically extended upward along with spoiler 25. In an embodiment, spoiler 25 shape is adjusted to a position so as to resist the maximum amount ambient fluid generating force on spoiler 25 '$F_{spoiler}$' (see also FIG. 11(b)). View 2-a(D2) shows hydraulic cylinders 24 and spoiler 25 sub-assembly in in-active original position (see also FIG. 11(a)), wherein internal cylinder 24-b and external cylinder 24-a are of identical length and spoiler 25 adjusted so that it does not resist any ambient fluid. View 2-a(D3) depicts hydraulic cylinders 24 and spoiler 25 sub-assembly in in-active final position wherein the internal cylinder 24-b is completely extended down (see FIGS. 12(a)-12(b)) and spoiler 25 is adjusted so that it does not resist any ambient fluid. Complete functionality of hydraulic cylinders 24 and spoiler 25 assembly shown in detailed views 2-a(D1) and 2-a(D2), is described further below while discussing the embodiments of drag force reduction process (see FIGS. 10(a)-10(b)) and configuration of detailed view 2-a(D3) can described while specifying FIGS. 12(a)-12(b).

Figure 7:
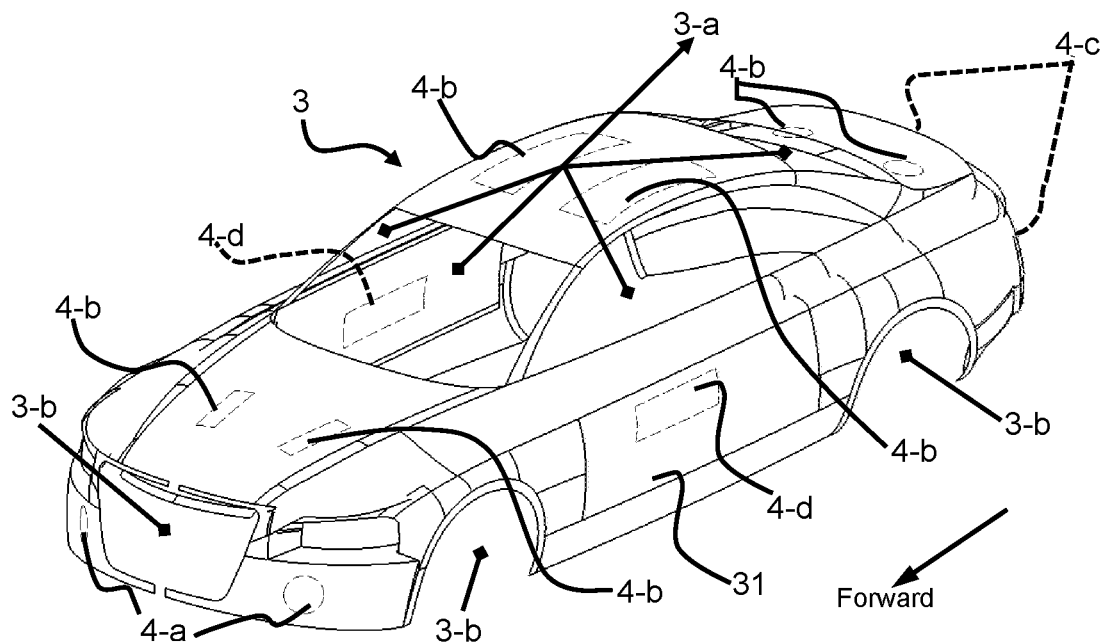
FIG. 7 illustrates an exemplary embodiment of the casing and magnets in perspective view.
Figure 8:
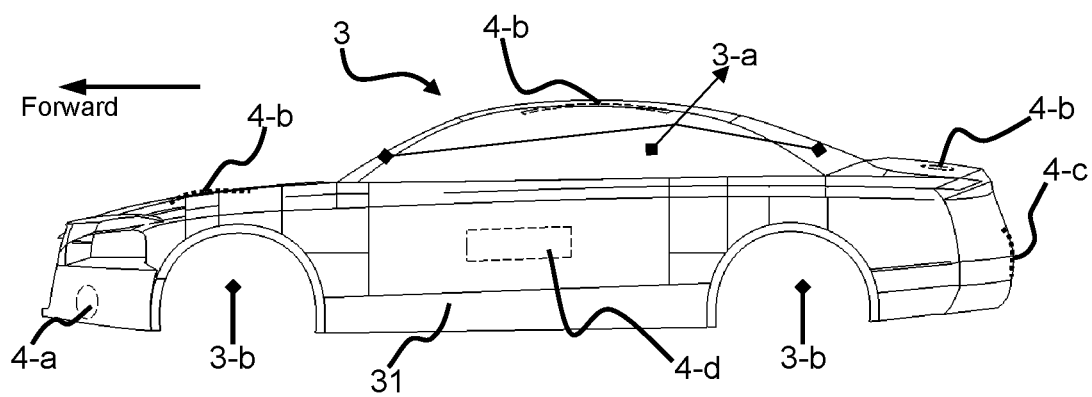
FIG. 8 illustrates a side view of an exemplary embodiment of the casing and magnets.

FIGS. 7-8 illustrate an embodiment of casing 3 and second set of plurality of magnets 4a-d (12 magnets). Casing 3 consists of an outer surface (visible in FIGS. 7-8) and an inner surface (hidden in FIGS. 7-8). Outer surface of casing 3 is in contact with the ambient fluid (see FIGS. 10(a)-10(b)), while second set of plurality of magnets 4a-d are attached to casing 3 inner surface. Magnets 4a-d (12 magnets) are shown using dashed lines as they are on inner surface of casing 3. Magnets 4-c (2 magnets—not visible) and magnet 4d (1 magnet right) are completely on other side of the view in FIG. 7 and are shown using dashed extension line. In the embodiment, second set of magnets 4a-d (12 magnets) on the inner surface of casing 3 (see FIGS. 7-8) are arranged symmetrically to the first set of magnets 4a-d (12 magnets see FIG. 4) shown on second modification-vehicle 20.

Figure 8A:
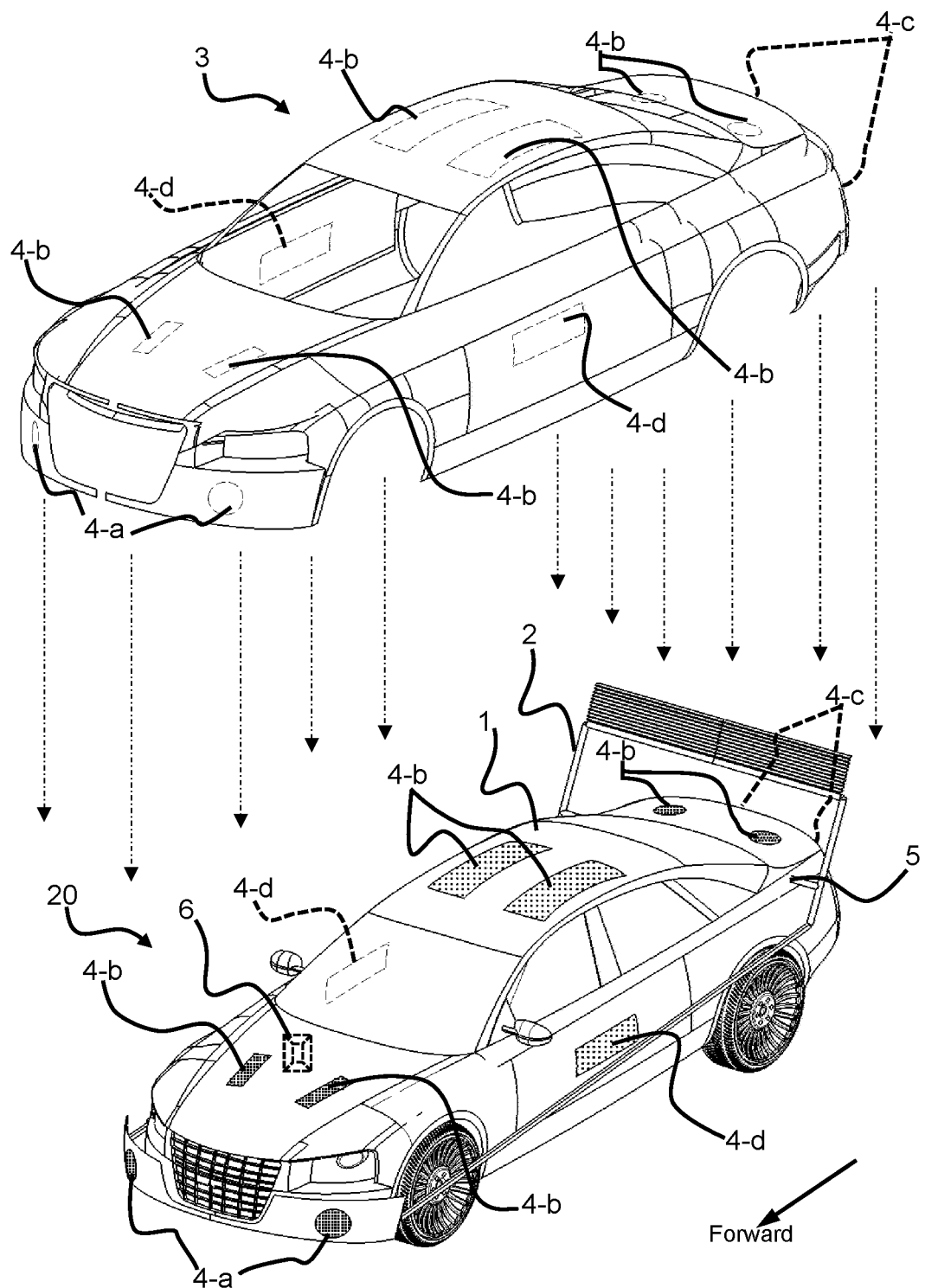
FIG. 8(a) illustrates an exemplary embodiment of the casing is being lowered onto second modification of vehicle.

In one exemplary embodiment FIG. 8(a), casing 3 along with second set of magnets 4a-d is lowered onto second modification-vehicle 20 acting as a covering for second modified-vehicle 20 (concurrently acting as covering to first modification-vehicle 10 and original vehicle 1). Also, second set magnets 4a-d (12 magnets) on the inner surface of casing 3 and first set of magnets 4a-d (12 magnets) shown on second modification-vehicle 20 are arranged such that the magnetic like poles face each other (North pole facing North pole or South pole facing South pole), this arrangement creates magnetic repulsion between the first set and second set of symmetrically arranged 12 pairs of magnets 4a-d (24 magnets in total) shown in FIGS. 1-2 illustrating a final modification-vehicle 44. Since, the magnets are symmetrically arranged with like poles facing each other; magnets 4-b (6 magnets—second set) on casing 3 inner surface repel magnets 4-b (6 magnets—first set) on second modification-vehicle 20, further the total 12 magnets 4-b are paired into 6 pairs of magnets 4-b that resist the weight of casing 3 due to magnetic repulsion (see FIGS. 1-2). Magnets 4-c (2 magnets—second set) attached to casing 3 rear inner surface are symmetric and repel the magnets 4-c (2 magnets—first set) attached to rear surface of second modification-vehicle 20 these are categorized into 2 pairs of magnets 4-c that help in stabilizing casing 3 resisting unwanted forward movement (see FIGS. 1-2). Magnets 4-$d$ (2 magnets—second set) attached to casing 3 left and right inner surfaces are symmetric and repel the magnets 4-$d$ (2 magnets—first set) attached to left and right surfaces of second modification-vehicle 20, these are categorized as 2 pairs of magnets 4-$d$ that help in stabilizing casing 3 resisting unwanted left and right movement. Magnets 4-$a$ (2 magnets—second set) attached to the front inner surface of casing 3 are symmetric and repel the magnets 4-$a$ (2 magnets—first set) attached at the front of second modification-vehicle 20, thus forming 2 pairs of magnets 4-$a$ that assist in transferring and countering drag force (see FIGS. 1-2 and FIGS. 10($a$)-10($b$)). These arrangements and pairing of magnets 4$a$-$d$ permits casing 3 to magnetically levitate and to move forward and back using magnetic repulsion phenomenon. Forward and backward movement of casing 3 is intended as a response to counter and transmit drag force respectively (see FIGS. 10($a$)-10($b$)).

In one embodiment, casing 3 is manufactured from lightweight and high stiffness material, such as stiffened polyethylene, carbon fiber reinforced composites or glass fiber reinforced composites or any combination thereof. The material used at locations 3-$a$ (see FIGS. 7-8) which are in the field of view of the user inside the final modification-vehicle 44 (FIGS. 1-2) should be transparent, such as high-density glass and plastic crystal glass. Disclosed embodiments of casing 3 has essential openings 3-$b$ (see FIGS. 7-8) that can accommodate essential features of second modification-vehicle 20 (such as opening for wheels, radiator locations). In an embodiment, casing 3 can be manufactured with a provision to accommodate casing 3 sides 31 to be separable features, such that sides 31 can altered to a stowed position (see FIGS. 12($a$)-12($b$)).

Figure 9:
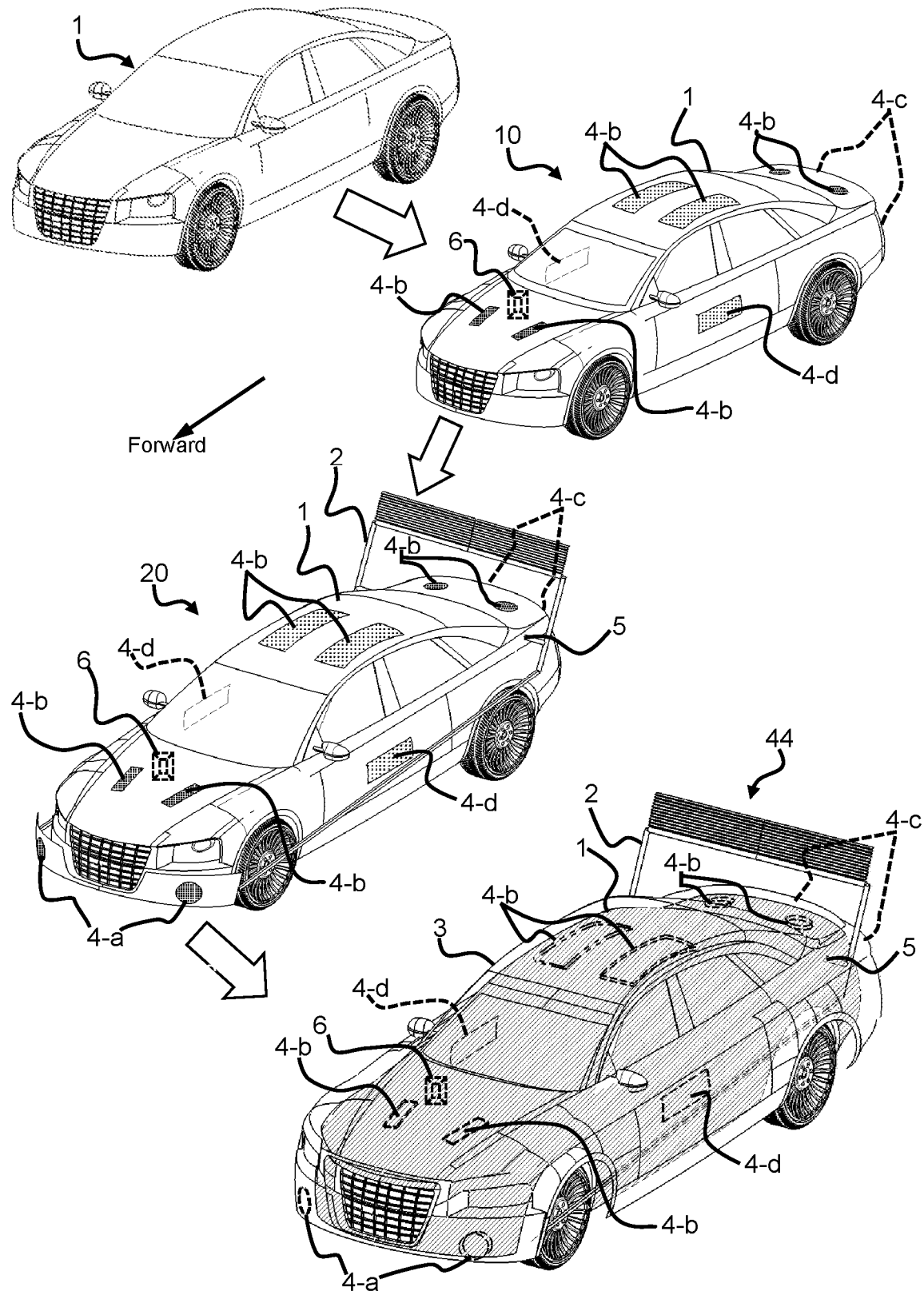
FIG. 9 illustrates an exemplary embodiment of the transformation of original vehicle to the final modification vehicle with drag reduction apparatus (three modifications).

FIG. 9 illustrates the embodiments representing the transformation of original vehicle 1 into final modification-vehicle 44 equipped with a drag reduction apparatus. As shown in FIG. 9, original vehicle 1 is retrofitted with first set of magnets 4$b$-$d$ and processor 6 to transform into first modification-vehicle 10. First modification-vehicle 10 is attached with mechanical mechanism 2 (which includes magnets 4-$a$—addition to first set of magnets, frame 21, hydraulic cylinders 24 and spoiler 25) to transform into second modification-vehicle 20. Second modification-vehicle 20 has a first set of 12 magnets 4$a$-$d$. Casing 3 (attached with second set of magnets 4$a$-$d$ which are symmetric and with magnetic like poles facing the same magnetic like poles of first set of magnets on second modification-vehicle 20) is lowered onto the second modification-vehicle 20 to create the final modification-vehicle 44. The first set of 12 magnets 4$a$-$d$ on second modification-vehicle 20 and second set of 12 magnets on casing 3 internal surface form magnetic repulsion pairs. In an embodiment, casing 3 is positioned to cover second modification-vehicle 20 (consequently covering original vehicle 1, first modification-vehicle 10) without having direct contact (due to 10 pairs of magnets 4$b$-$d$ acting as with magnetic repulsion pairs), non-significant force carrying contacts made of flexible, durable rubber can be attached between casing 3 and second modification-vehicle 20 in order to provide additional stability to the casing 3. Furthermore, casing 3 forms as external surface of final modification-vehicle 44 and is configured to shield the external air from being in contact with original vehicle 1, thus forming a barrier. When final modification-vehicle 44 with drag reduction apparatus is in motion, drag force experienced by original vehicle 1 (without drag reduction apparatus) due to contact with air molecules, is shifted to casing 3 (which is acting as covering—see also FIGS. 11($a$)-11($b$))

FIG. 10($a$) illustrates an embodiment where the drag force (see drag force calculation equation 2-a; $F_D+F_V+F_R$) experienced by casing 3 is transferred to mechanical mechanism 2 using magnetic repulsion of 2 pairs of magnets 4-$a$. Drag force on casing 3 initiates the backward movement of casing 3 pushing mechanical mechanism 2—2 pairs of magnets 4-$a$—frame 21 (3→21) to roll backward on rollers 23 (see FIG. 6 for frame 21 and roller 23 arrangement). The backward movement of frame 21 pushes struts 22 (21→22) backward, which in-turn rotates hydraulic cylinders 24 about pivot joint 5 in counter-clockwise (25-$a$, ↺) direction (see FIG. 10($a$); 22→24(↺)—counter-clockwise direction based on the view shown). The rotation of hydraulic cylinders 24 activates processor 6. Processor 6 sends signal to spoiler 25 in in-active original position (see also FIG. 6($a$)—view 2-$a$(D2)) for in-active original position) to change to active release position (see also FIG. 6($a$)—view 2-$a$(D1) for active release position) using a controlled approach (see FIG. 14). Spoiler 25 release rate depends on the force required by spoiler 25 to counter the drag force of a moving final modification-vehicle 44.

In another embodiment as depicted in FIG. 10($b$), when spoiler 25 is released (see also FIG. 6($a$)—view 2-$a$(D1)) for active release position) using controlled approach by processor 6, spoiler 25 resists the ambient fluid by disturbing the ambient fluid flow, thus creating a force on the spoiler 25 '$F_{spoiler}$'. The force ($F_{spoiler}$) created at spoiler 25 rotates the hydraulic cylinders 24 in clockwise (25-$b$, ↻) direction about pivot joint 5 (25→24(↻)); clockwise direction based on the view shown in FIG. 10($b$)). The clockwise (25-$b$, ↻) rotation of hydraulic cylinders 24 exerts force on struts 22 (22←24) initiating a forward movement of struts 22. Forward movement of struts 22 in turn initiates forward movement of frame 21 (21←22). In the embodiment frame 21 consequently pushes casing 3 forward using magnetic repulsion of 2 pairs of magnets 4-$a$ (3←21). Thus, the backward movement of generated by the drag force (see drag force calculation equation 2-a; $F_D+F_V+F_R$) is countered by the forward movement generated by the force at the spoiler 25 ($F_{spoiler}$) (see FIGS. 10($a$)-10($b$)).

FIG. 11($a$) illustrates an embodiment showcasing the drag force experienced by original vehicle 1. The total drag force can be divided into three main components $F_D$ (form drag), $F_V$ (viscous drag) and $F_R$ (pressure drag), further defined below. Considering general drag force equation, form drag force $F_D$ generated by original vehicle 1 for a frontal cross-sectional area 'A' will be as follows:

$$F_D = C_d(\tfrac{1}{2})\rho V^2 A \qquad (1)$$

Where $C_d$ is the coefficient of drag for shape resisting drag force, $\rho$ is the density of the ambient fluid and V is speed of the moving object. Drag force shown in equation 1 is due to shape of the object hence considered as form drag. There is a component of drag which is called viscous drag $F_V$, which is caused due to friction between the ambient fluid against the surface of the object. Viscous drag force $F_V$ also follows the same formula as shown in equation 1 except the coefficient of drag $C_d$ in equation 1 is changed to $C_V$ viscous drag coefficient and frontal cross-sectional area 'A' is changed to surface area '$A_S$'.

$$F_V = C_V(\tfrac{1}{2})\rho V^2 A_S \qquad (2)$$

Further, the flow of fluid at rear surface creates space void of ambient fluid as the original vehicle 1 passes through the ambient fluid. This inability of ambient fluid to fill the space left by the original vehicle 1 is caused by "Flow Detachment". This generates a force due to the pressure difference is represented by '$F_R$', signifying drag force at rear of the original vehicle 1. The total drag force from FIG. 11(*a*) on original vehicle 1 is obtained by adding all the drag force components in equation 1, 2 and 3:

$$\text{Total drag force} = F_D + F_V + F_R \qquad (2\text{-a})$$

The total drag force in equation 2-a has to be balanced by force from original vehicle 1, $F_{-1}$ (without drag reduction apparatus) to achieve force equilibrium and to overcome drag. The force equilibrium equation from FIG. 11(*a*) for original vehicle 1 can be defined as:

$$F_D + F_V + F_R = F_{-1} \qquad (3)$$

Equation 3 theoretically shows that the original vehicle 1, force $F_{-1}$ is required to overcome the total drag force. The original vehicle 1, force $F_{-1}$ constitutes to energy generated from the original vehicle 1 at the expense fuel.

FIG. 11(*b*) illustrates an embodiment showcasing the drag force experienced by the final modification-vehicle 44. The drag force components $F_D$ (form drag), $F_V$ (viscous drag) and $F_R$ (pressure drag) described for original vehicle 1 are still applicable for final modification-vehicle 44 (with change in coefficients of drag and cross sectional and surface areas), therefore equation 1, 2 and 2-a are still applicable and are valid for FIG. 11(*b*) embodiment of final modification-vehicle 44. Further, the embodiment in FIG. 11(*b*) directs that the viscous drag $F_V$, pressure drag $F_R$ and the component $F_D$ (form drag) taken by casing 3 and is resisted by the force from spoiler 25 '$F_{spoiler}$' (in active release position). Only a component of $F_D$ (form drag) is considered to be resisted by the spoiler 25 '$F_{spoiler}$', this is attributed due to the fact that casing 3 has essential openings 3-*b* (see FIGS. 7-8) that can accommodate essential features of second modification-vehicle 20 (such as opening for wheels, radiator locations). Casing 3 openings 3-*b* permits component of ambient fluid to get in contact with original vehicle 1, therefore only component of $F_D$ is resisted by spoiler 25 '$F_{spoiler}$', and the remaining component of $F_D$ is to be resisted by original vehicle 1 force $F_{-44}$ (with drag reduction apparatus attached). The force generated at the spoiler 25 '$F_{spoiler}$' (in active release position) is shown in equation 4 which follows the same principle of form drag shown in equation 1.

$$F_{spoiler} = C_{ds}(\tfrac{1}{2})\rho V^2 A_{spoiler} \qquad (4)$$

Where $C_{ds}$ is the coefficient of drag for spoiler shape, $\rho$ is the density of the ambient fluid and V is speed of the moving object and frontal cross-sectional area of spoiler '$A_{spoiler}$'.

The drag force that is countered in embodiment of FIG. 11(*b*) using the force equilibrium is elucidated mathematically in the following equations:
Force Equilibrium Equation for Final Modification-Vehicle 44:

$$(\text{Component of } F_D) + F_V + F_R = F_{spoiler} \qquad (5)$$

$$(\text{Remaining component of } F_D) = F_{-44} \qquad (6)$$

Comparing equations 3, 5 and 6 it is clearly proven that original vehicle 1, force $F_{-1}$ required for resisting the drag force in embodiment FIG. 11(*a*) (without drag reduction apparatus) is greater than original vehicle 1, force $F_{-44}$ (with drag reduction apparatus attached), shown in embodiment FIG. 11(*b*). Thus, attaching the drag reduction apparatus to original vehicle 1 as represented in final modification-vehicle 44 reduced the use of energy from fuel to resist the drag, in turn increasing the fuel economy, reducing emissions and cost.

The embodiments of magnets 4*a*-*d* (12 pairs) discussed in FIGS. 1-12(*b*) can be permanent magnets made of 'neodymium' or 'somarium cobalt' or any combination thereof—having high repulsion force, should withstand repeated temperature changes and should be anticorrosive.

Figure 12A:
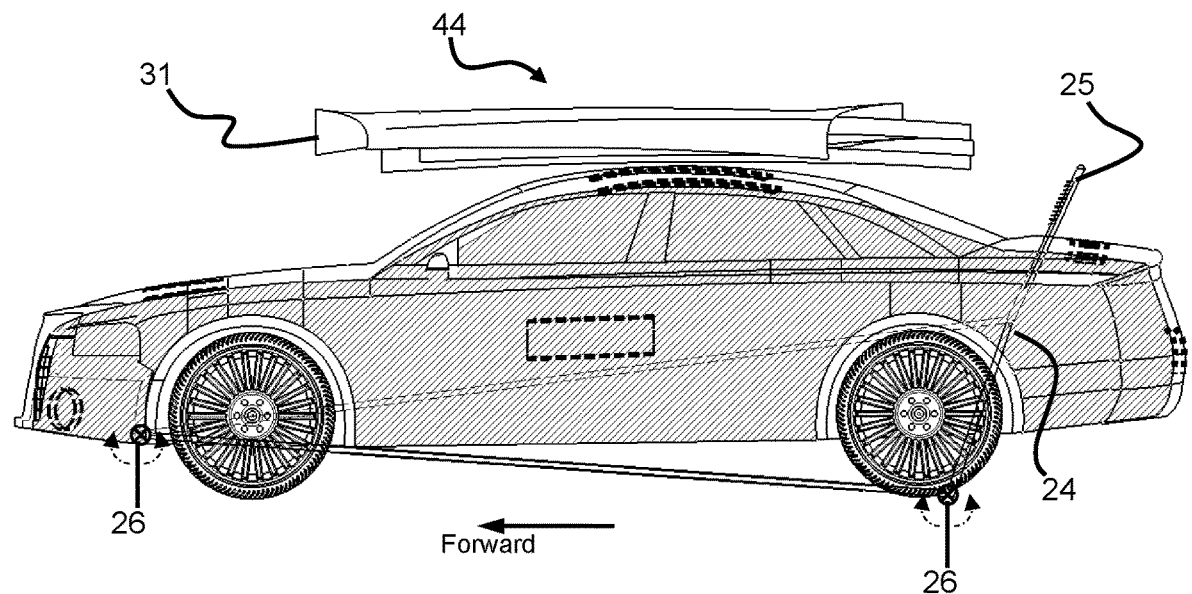
FIG. 12(a) illustrates a side view of an exemplary embodiment of the final modification vehicle with drag reduction apparatus when the vehicle is stationary, casing sides in stowed position and spoiler in in-active final position.
Figure 12B:
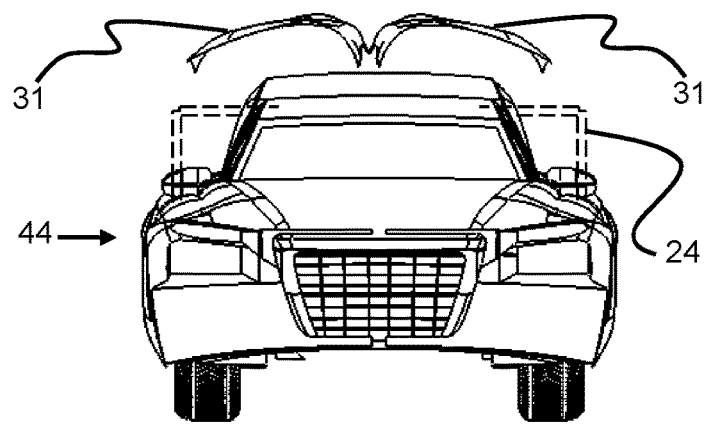
FIG. 12(b) illustrates a front view of an exemplary embodiment of the finally modified vehicle with drag reduction apparatus when the vehicle is stationary, casing sides in stowed position.

FIGS. 12*a*-12*b* illustrate the embodiments of final-modification vehicle 44 when in stationary position (both side view and front view shown respectively) and when a user enters or exits the vehicle. The embodiments shown are only a reference to allow the user to enter or exit final-modification vehicle 44. Processor 6 which activates once hydraulic cylinders 24 start to rotate, senses whether final modification-vehicle 44 is stationary or moving (see also FIGS. 13-14). If processor 6 determines that final-modification vehicle 44 is not in motion and the user is trying to open final modification-vehicle 44 door, processor 6 activates hydraulic cylinders 24 to slide down and also deactivates spoiler 25 as per view shown in 2-*a*-(D3) of FIG. 6(*a*). Sliding hydraulic cylinders 24 down makes the mechanical mechanism 2—struts 22 to rotate at cylindrical joints 26 making a way for opening final modification-vehicle 44 doors. This embodiment also depicts sides 31 of casing 3 in stowed position overlaying a way for the user entry and exit in final modification-vehicle 44.

Figure 13:
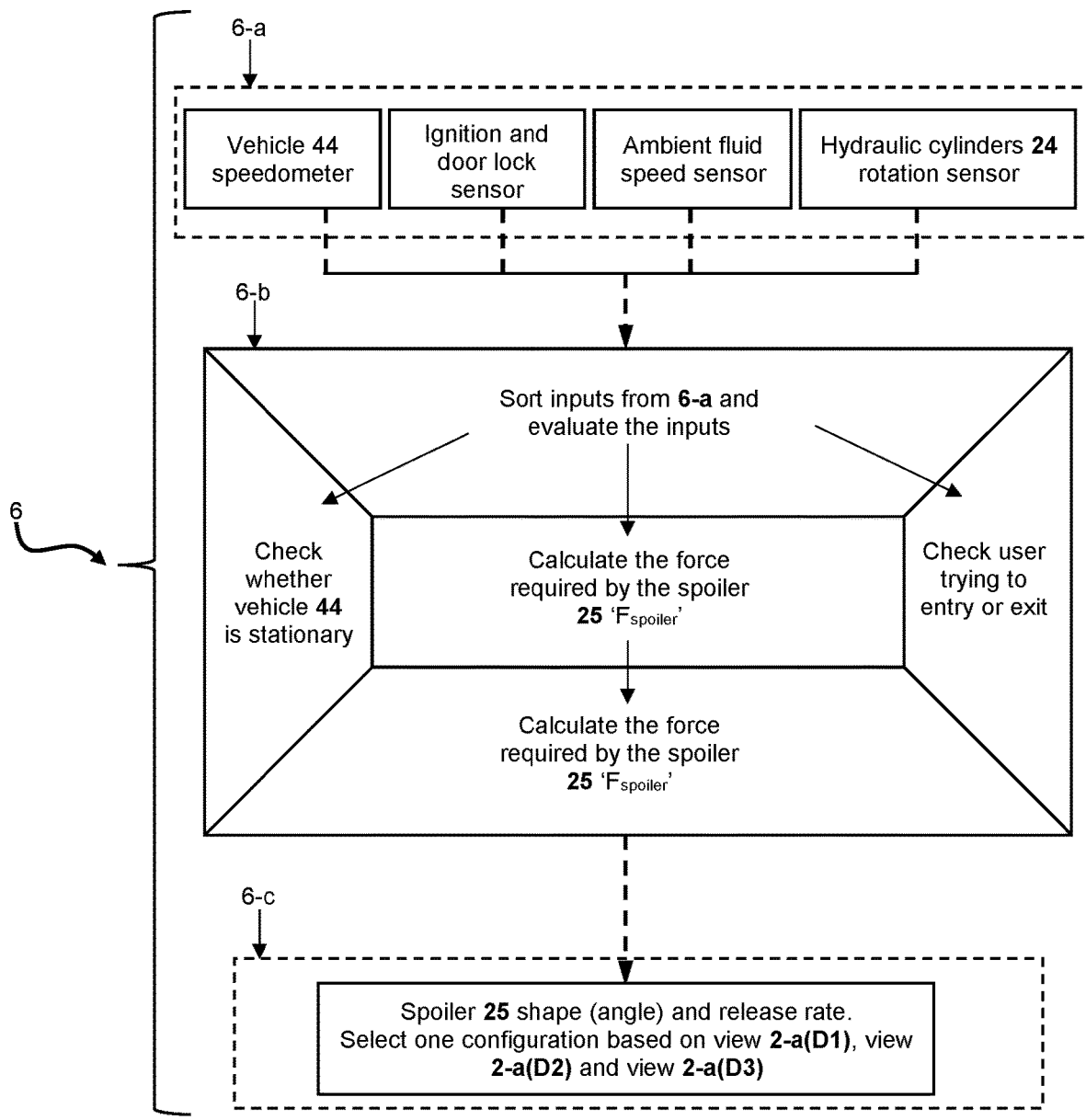
FIG. 13 is a detailed block diagram illustrating an exemplary embodiment of processor according to the present disclosure.

FIG. 13 illustrates a block diagram showing an embodiment of processor 6, wherein processor 6 functions are divided into input data 6-*a*, data sorting and evaluation 6-*b* and output 6-*c*. Input data 6-*a* is taken from final modification-vehicle 44 speedometer, ignition and door lock sensor, ambient fluid speed sensor and hydraulic cylinder rotation sensor. The inputs from final modification-vehicle 44 speedometer determines whether the final modification-vehicle 44 is moving or in stationary position. If final modification-vehicle 44 is determined as stationary, then the ignition and door sensor data is considered, after determining the door is opening and ignition is off; processor 6 signals the spoiler 25 to be retracted and hydraulic cylinders 24 extended to the bottom as shown in FIG. 6(*a*) view 2-*a*(D3) (spoiler 25 in-active final position with hydraulic internal cylinders 24-*b* completely extended down). If final modification-vehicle 44 is determined as moving, then ambient fluid speed sensor and hydraulic cylinders 24 rotation sensor is considered to determine the spoiler 25 force '$F_{spoiler}$' (see equation 4). After determining spoiler 25 force '$F_{spoiler}$' the rate of extension of spoiler 25, hydraulic cylinders 24 and the angle of spoiler 25 is determined as processor 6 output. Processor 6 signals mechanical mechanism 2 activating the view 2-*a*(D1) shown in FIG. 6(*a*) (spoiler 25 active release position). In another embodiment if final modification-vehicle 44 is determined as stationary (ready to move) but ignition and door lock sensor not active processor 6 processes the data and sets mechanical mechanism 2 to view 2-*a*(D2) shown in FIG. 6(*a*) (spoiler 25 in-active original position). Processor 6 can be electronically to input data sensors and output to mechanical mechanism 2 through wired or wireless connection(s).

Figure 14:
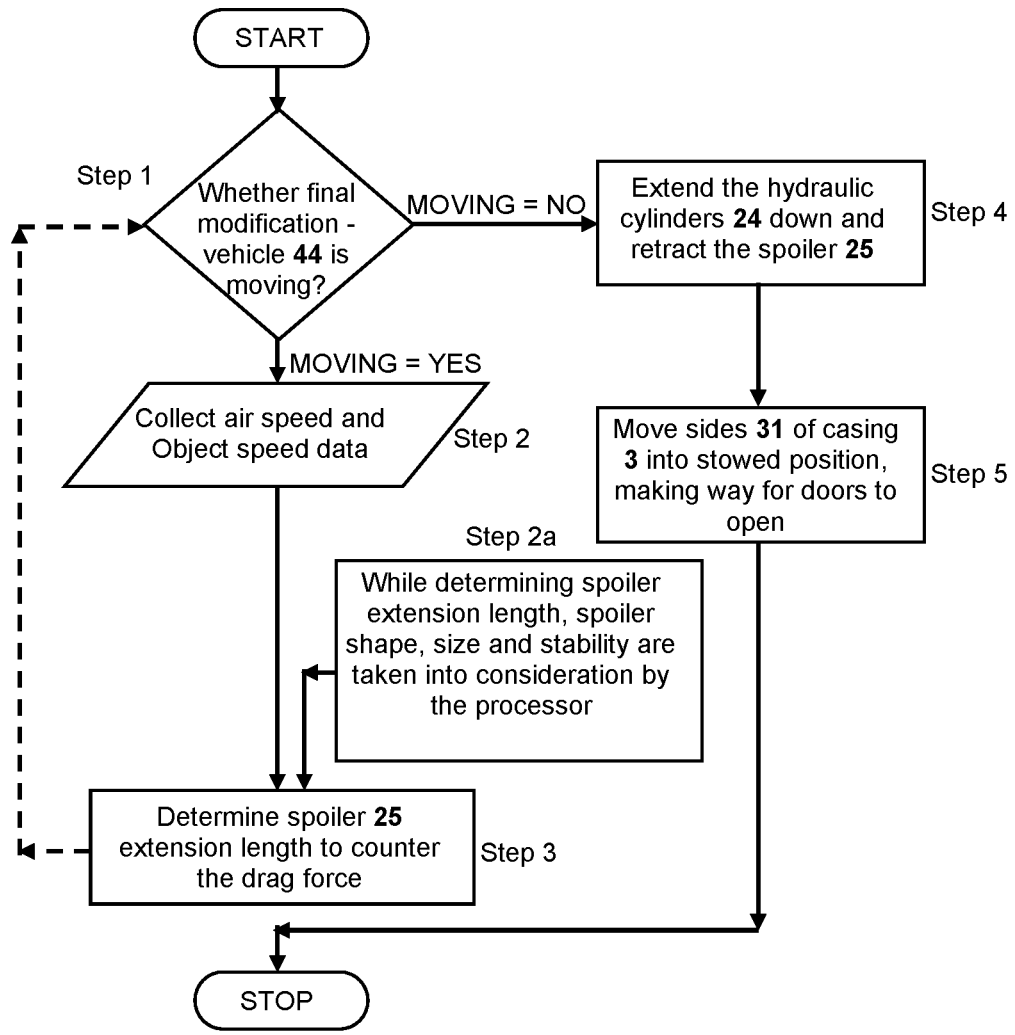
FIG. 14 is a flow chart illustrating the functionality of the processor and the logic followed by the processor to control the spoiler release rate.

The functional flow processor 6 is shown as a flow chart in FIG. 14. In Step 1, once processor 6 is activated by rotation of hydraulic cylinders 24, it collects data from the final modification-vehicle 44 to check whether final modification-vehicle 44 is moving or stationary. In Step 2, if processor 6 determines the final modification-vehicle 44 is moving, it then collects ambient fluid speed and final modification-vehicle 44 speed data. In Step 3, processor 6 then evaluates spoiler 25 release rate to counter drag force experienced by the final modification-vehicle 44. Further, spoiler 25 release rate depends on shape, size, stability of spoiler 25 which are evaluated in processor 6 (see Step 2a). This process continues as a feedback loop system until final modification-vehicle 44 comes to a complete stop.

In Step 4, when the final modification-vehicle 44 comes to a stationary position, processor 6 determines that the final modification-vehicle 44 has stopped and the ignition is off (or door opening), it activates a signal which disengages spoiler 25 and slides hydraulic cylinders 24 extending down, and then in Step 5, concurrently lifting the sides 31 of casing 3 to stowed position. The activities performed in steps 4 and 5 by processor 6 paves way for the user to open the door while entering and exiting the vehicle.

The system as described in FIGS. 13-14 may be implemented using any combination of application specific integrated circuit(s) (ASIC(s)), programmable logic device(s) (PLD(s)), field programmable logic devices(s) (FPLD(s)), discrete logic, hardware, and/or firmware, as examples.

Thus, specific embodiments of a drag reduction apparatus and methods to employ such apparatus have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A drag reduction apparatus for an object in motion, comprising:
   (a) an original body and an original body outer surface;
   (b) a first set of plurality of magnets positioned on said original body outer surface;
   (c) a processor
   (d) a mechanical mechanism comprising a plurality of magnets as addition to first set of plurality of magnets, a frame, a plurality of rollers, a plurality of struts, a plurality of pivoted hydraulic cylinders and a spoiler;
   (e) a plurality of magnets as addition to first set of plurality of magnets attached to said frame; and
   (f) a casing with an external surface, and an internal surface and separable sides of body, wherein a second set of plurality of magnets positioned on said internal surface of said casing;
   wherein said mechanical mechanism attached to said original body with a plurality of pivot joints on said plurality of hydraulic cylinders;
   wherein said frame is configured to slide on said plurality of rollers attached to said original body and to said plurality of struts;
   wherein said plurality of struts attached to said plurality of pivoted hydraulic cylinders; and
   wherein said plurality of pivoted hydraulic cylinders attached to said spoiler.

2. The drag reduction apparatus as recited in claim 1, wherein said processor is configured to detect said object motion, said object speed, and ambient fluid speed to activate said mechanical mechanism based on evaluations of data received.

3. The drag reduction apparatus as recited in claim 1, wherein said casing with said second set of plurality of magnets attached on said inner surface and lowered onto said original body attached with said first set of plurality of magnets and mechanical mechanism, is configured to cover said moving object attached with said mechanical mechanism and forming a barrier.

4. The drag reduction apparatus as recited in claim 1, wherein said casing with second set of plurality of magnets and the first set of plurality of magnets arranged in a symmetrical pattern with magnetic like poles facing each other forming magnetic repulsion pairs, such that said casing is set to magnetically levitate and move in backward and forward direction while encountering and resisting to drag force correspondingly.

5. The drag reduction apparatus as recited in claim 1, wherein said magnetic repulsion pairs formed to resist weight of said casing, to stabilize said casing and to transfer and resist drag force using said casing and said mechanical mechanism.

6. The drag reduction apparatus as recited in claim 1, wherein said casing is configured to receive drag force from said ambient fluid and transfer to said mechanical mechanism.

7. The drag reduction apparatus as recited in claim 1, wherein said drag reduction apparatus is configured to resist drag force using the force generated at said spoiler by releasing said spoiler upon signal from said processor; also rotating said hydraulic cylinders about the pivot joints in counterclockwise ((↺)) or clockwise ((↻)) directions.

8. The drag reduction apparatus as recited in claim 1, wherein said casing sides are separable where said casing sides can be stowed or released based on motion of said object.

9. The drag reduction apparatus as recited in claim 1, wherein said drag reduction apparatus is configured to increase fuel efficiency and reduce the operational cost of said mechanical objects in motion.

* * * * *